United States Patent [19]
Kim et al.

[11] Patent Number: 5,622,413
[45] Date of Patent: Apr. 22, 1997

[54] VALVE UTILIZING SHAPE MEMORY ALLOYS AND AN ANTI-LOCK BRAKE SYSTEM WITH THE VALVE

[75] Inventors: Sang K. Kim; PahngRoc Oh; Hong J. Lee, all of Seoul, Rep. of Korea

[73] Assignee: Daewoo Electronics Co., Ltd., Seoul, Rep. of Korea

[21] Appl. No.: 516,083

[22] Filed: Aug. 17, 1995

[30] Foreign Application Priority Data

Aug. 17, 1994 [KR] Rep. of Korea ............... 94-20227
Aug. 17, 1994 [KR] Rep. of Korea ............... 94-20228

[51] Int. Cl.⁶ ............................................. B60T 8/36
[52] U.S. Cl. ............................ 303/119.2; 303/113.1; 251/11
[58] Field of Search ................. 303/119.1, 119.2, 303/113.1; 251/11

[56] References Cited

U.S. PATENT DOCUMENTS

3,835,659  9/1974  McBride, Jr. .................. 62/202
4,068,820  1/1978  Pimentel ....................... 251/11
4,736,587  4/1988  Suzuki ....................... 251/11 X
5,211,371  5/1993  Coffee ......................... 251/11

*Primary Examiner*—Lee W. Young
*Attorney, Agent, or Firm*—Lowe, Price, LeBlanc & Becker

[57] ABSTRACT

A valve (actuator) for performing pressurization, decompression and pressure maintenance drives plural spools movable up and down within a housing having plural bores by using linear shape memory alloys, and an anti-lock brake system utilizes the valve, in which respective bores have inlets and outlets, a mechanism for holding a lowering state of the spools is installed to the lower portion of the housing, and the spools return to their original positions by bias springs. A master cylinder, a wheel brake and a hydraulic pump are connected to the inlets and outlets of the valve of the anti-lock brake system and an electronic control unit is connected to the shape memory alloys to actuate the shape memory alloys, thereby attaining the operations of pressurization, decompression and pressure maintenance in connection with a brake pressure of the wheel brake.

10 Claims, 8 Drawing Sheets

VALVE UTILIZING SHAPE MEMORY ALLOYS AND AN ANTI-LOCK BRAKE SYSTEM WITH THE VALVE

BACKGROUND OF THE INVENTION

1. Field of the Invention

The present invention relates to a valve utilizing shape memory alloys and an anti-lock brake system with the valve, and more particularly to a valve utilizing electrically-controlled shape memory alloys and an anti-lock brake system provided with the valve.

2. Description of the Prior Art

A shape memory alloy denotes an alloy that preserves a shape deformed by an external force below a critical temperature, whereas a shape memory effect of the alloy is activated for recovering a memorized original shape by a shape recovering force after being heated up to the critical temperature. Shape memory alloys such as a titanium-nickel alloy and an aluminum alloy are manufactured to have a predetermined shape at a high temperature. Such a shape memory alloy is utilized for valves of various types, and cooperates mechanically or electrically with the valve for moving elements of the valve to a predetermined direction to open/close ports of the valve.

There are methods for applying heat upon the shape memory alloys: one is to permit fluid to flow around the shape memory alloys to vary the temperature of the fluid, and another is to permit current to flow in the shape memory alloys to generate heat by an electrical resistance of the shape memory alloys.

Figure 1:
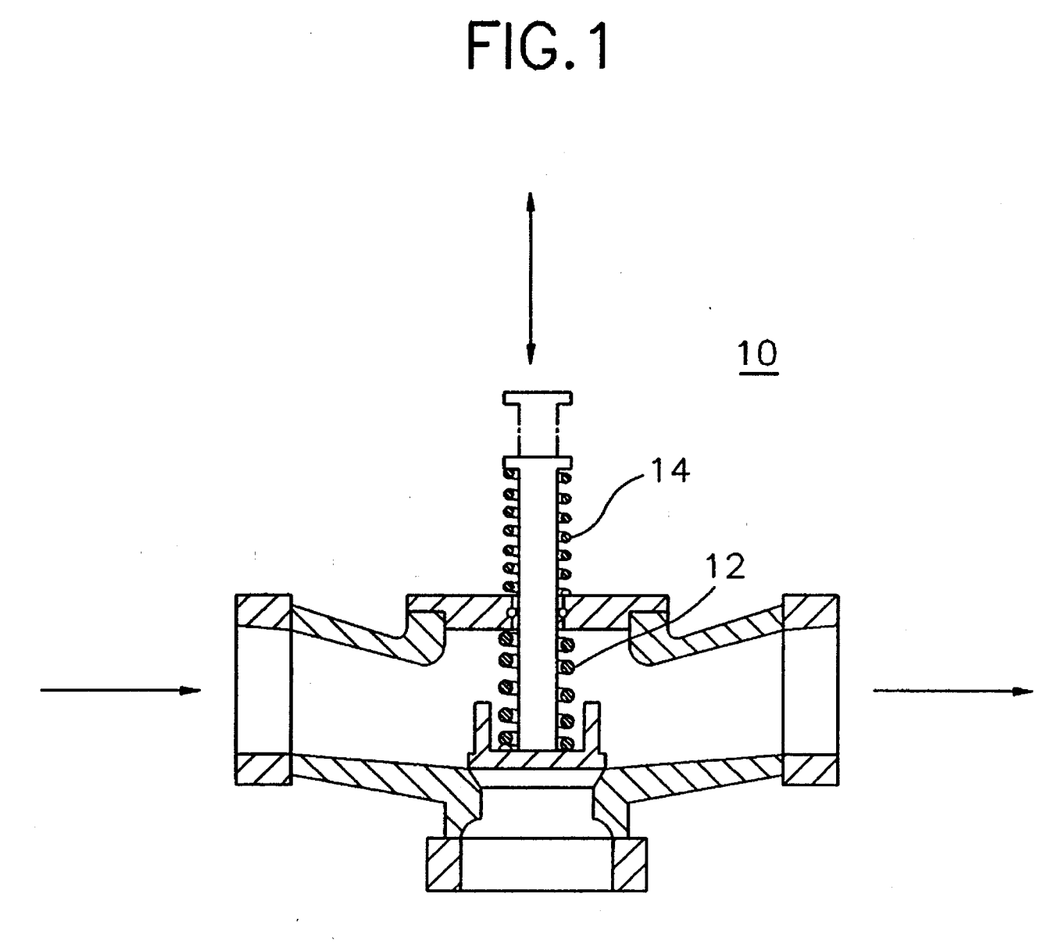
FIG. 1 is a schematic sectional view for showing a conventional valve utilizing a shape memory alloy spring.

FIG. 1 illustrates one example of a valve 10 for subjecting the shape memory alloys to heating by varying a temperature of fluid flowing around the shape memory alloys.

In FIG. 1, a spring 12 is in the shape of a coil spring which is manufactured by using a shape memory alloy. The fluid flows around spring 12. Once a temperature of the fluid is raised to reach a critical temperature of the shape memory alloy that initiates the shape memory effect, spring 12 is compressed by the shape recovery force to open valve 10. Meanwhile, when the temperature of the fluid is lowered, spring 12 is relaxed by a bias spring 14 to close valve 10.

However, the conventional valve 10 utilizing the above-described shape memory alloy spring 12 has drawbacks of difficulty in accurately controlling the opening range of valve 10 as well as a slow response speed of spring 12 with respect to the fluid temperature. Additionally, it involves a fastidious manufacturing process since the shape memory alloys must be shaped as the coil.

A valve for improving the above-stated problems is disclosed in U.S. Pat. No. 5,211,371 (issued to Coffee). Shape memory alloys utilized in the valve of Coffee are in the shape of a wire which is electrically-controlled by an electric circuit. The electric circuit is a closed circuit comprising a plurality of transistors and a plurality of capacitors, so that the shape memory alloys are actuated in conformity with a cycle by using operations of charging/discharging the capacitors and switching the transistors.

In the valve of Coffee, however, the valve should be continuously in the open state for maintaining a prescribed pressure. Furthermore, the shape memory alloys should be continuously supplied with current to maintain the open state of the valve. In this case, not only the power is significantly dissipated due to the continuous supply of the current, but also the control of the opening/closing operation of the valve by using the current supply is difficult while the shape memory characteristic is likely to be lost.

U.S. Pat. No. 5,092,901 (issued to Hunter et al.) describes shape memory alloy fibers with very short total contraction and relaxation time suitable for being employed as an electro-magnetic actuator. However, Hunter et al. do not specially disclose a valve utilizing the shape memory alloy fibers.

On the other hand, as is widely known, an anti-lock brake system (ABS) indicates a break system for preventing slipping along a road surface of wheels which are locked by the operation of the brake, and for improving a steering property. Especially, the anti-lock brake system affords an effective braking force and a steering capability in case of a sudden stop, braking on a curvy road, a wet road in the rain and an icy ground, and the like.

In the conventional anti-lock system as described above, pressure-regulating valves of respective wheels are formed of two valves of a diaphragm pattern, i.e., a pressure-holding valve and an exit valve. The pressure-holding valve and exit valve are controlled by two solenoid valves. In a normal braking operation, operation fluid flows to a brake cylinder via the pressure-regulating valves to realize the braking operation. Meantime, if one of the wheels is too abruptly locked, an electronic control unit (ECU) of the anti-lock brake system operates two solenoid valves to control the pressure within the brake cylinder and repeats locking and unlocking of the wheel at a very high speed, so that the slipping of the wheels is prevented while enhancing the steering capability.

However, the solenoid valves utilized for the anti-lock brake system have a complicated structure to require a demanding job in designing and manufacturing process with the consequence of high cost. In connection with the aforesaid valve that utilizes the shape recovery force of the shape memory alloy attributed to the temperature variation of the fluid, the shape memory alloy having a slow response speed with respect to the fluid temperature cannot be employed for the anti-lock brake system which requires a high-speed operation. Moreover, the above valve of Coffee has a difficulty in controlling the opening/closing operation of the valve which is unsuitable for the anti-lock brake system. Further, even though the shape memory alloys of Hunter et al. having short contraction and relaxation time are employed in the anti-lock brake system, the continuous current supply as described above necessarily results in the risks of significant power dissipation and possible loss of shape memory characteristic.

SUMMARY OF THE INVENTION

Accordingly, it is a first object of the present invention to provide a valve utilizing shape memory alloys which is promptly operated, freely and accurately controlled in an open/close operation thereof, and has a simple structure to facilitate the designing and manufacturing thereof.

It is a second object of the present invention to provide an anti-lock brake system with a valve utilizing shape memory alloys capable of being promptly and accurately operated while having a simple structure.

To achieve the first object of the present invention, a valve utilizing shape memory alloys according to one embodiment of the present invention includes an electronic control unit for generating first control current. A housing of the valve has a first bore which includes a first inlet for introducing fluid from a fluid supply source and a first outlet for discharging the fluid to an operating object in an upper portion thereof, and a compartment is provided to a lower portion thereof. A first valve spool closes the first inlet at a first position, opens the first inlet at a second position thereof, and reciprocates between the first position and second position. A biasing unit applies a biasing force upon the first valve spool, and an actuating unit utilizes shape memory alloy wires for moving the first valve spool from the first position of the first valve spool or from the second position of the first valve spool or from the second position of the first valve spool to the first position of the first valve spool by means of the first control current supplied from the electronic control unit to open or close the first bore.

Here, the biasing unit is a plate spring which is installed to an inner sidewall of the compartment for exerting an upward biasing force by a snap-through buckling to maintain the first valve spool to the first position of the first valve spool when the valve spool is placed on the first position of the first valve spool, and applying a downward deflection force by the snap-through buckling to maintain the first valve spool to the second position of the first valve spool when the valve spool is placed on the second position of the first valve spool.

Also, the actuating unit includes a first shape memory alloy wire, a lever, a second shape memory alloy wire and a restoring spring.

The first shape memory alloy wire is electrically connected to the electronic control unit, of which one end is fixed to a lower surface of the plate spring and other end is fixed to a bottom surface of the compartment, and moves the first valve spool to the second position of the first valve spool to open the first inlet while overcoming the upward biasing force of the plate spring when the electronic control unit supplies the first control current thereto.

The second shape memory alloy wire is also electrically connected to the electronic control unit, which as one end fixed to one end of the lever and the other end fixed to the bottom surface of the compartment, and pivots the lever when a second control current is supplied from the electronic control unit thereto.

The lever is installed to the bottom surface of the compartment to be capable of pivoting about a shaft, the upper portion thereof contacts the plate spring when the valve spool is placed on the second position of the first valve spool. The lever applies a force to deform the plate spring to be bulgy upward while pivoting by the second shape memory alloy wire. Consequently, the first valve spool is moved to the first position of the first valve spool to close the first inlet.

The restoring spring is installed between the lever and bottom surface of the compartment, and applies a restoring force to pivot the lever pivoted by the second shape memory alloy wire to return to the original position thereof when the supply of the second control current from the electronic control unit is intercepted.

Therefore, when the valve utilizing the shape memory alloys according to the present invention is employed by two, the effect obtained by 3-position 3-way valve can be offered. In addition, the valve has a simple structure and easy to be manufactured as well as economizes manufacturing cost.

Meanwhile, in order to achieve the second object of the present invention, an anti-lock brake system includes a master cylinder for generating a hydraulic pressure to a wheel brake attached to a wheel of a vehicle. In addition, a hydraulic regulating part has a hydraulic pump for regulating the hydraulic pressure of the master cylinder and a hydraulic motor for driving the hydraulic pump. An accumulator linked to the hydraulic pump stores brake oil. Also, a wheel-speed sensor attached to the wheel senses a wheel speed to generate a wheel-speed signal, and a vehicle-speed sensor senses a vehicle speed to generate a vehicle-speed signal. An electronic control unit receives the vehicle-speed signal and wheel-speed signal, and calculates a difference between the vehicle-speed signal and wheel-speed signal to generate first control current, second control current, third control current, and fourth control current. Furthermore, the anti-lock brake system includes a first valve utilizing a plurality of shape memory alloys for admitting the brake oil to press the wheel brake when the first control current is supplied, and intercepting the supply of the brake oil to the wheel brake when the second control current is supplied. A second valve discharges the brake oil from the wheel brake to the accumulator when the third control current is supplied from the electronic control unit so as to decrease pressure of the wheel brake, and blocks between the wheel brake and accumulator when the fourth control current is supplied so as to obstruct the flow of the brake oil from the wheel brake.

At this time, the first valve includes a first housing which has a first bore with a first inlet connected between the master cylinder and hydraulic pump and a first outlet connected to the wheel brake in the upper portion thereof, and a first compartment in the lower portion thereof. A first valve spool of the first valve closes the first inlet at the first position, and opens the first inlet at the second position. A first unit applies an upward biasing force by a snap-through buckling to maintain the first valve spool to the first position of the first valve spool when the first valve spool is placed on the first position of the first valve spool, and applies a downward biasing force by the snap-through buckling to maintain the first valve spool to the second position of the first valve spool when the first valve spool is placed on the second position of the first valve spool. A first shape memory alloy member moves the first valve spool to the second position while overcoming the upward biasing force of the first unit when the first control current is supplied from the electronic control unit. Besides, a second unit moves the first valve spool to the first position of the first valve spool while overcoming the downward biasing force of the first unit when the second control current is supplied from the electronic control unit.

The second valve includes a second housing which has a second bore with a second inlet connected between the first valve and wheel brake and a second outlet connected between the hydraulic pump and accumulator in the upper portion thereof, and a second compartment in the lower portion thereof. A second valve spool of the second valve closes the second outlet on the first position, and opens the second outlet on the second position. A third unit applies the upward biasing force by the snap-through buckling to maintain the second valve spool to the second position of the second valve spool when the second valve spool is placed on the second position of the second valve spool, and applies the downward biasing force by the snap-through buckling to maintain the second valve spool to the second position of the second valve spool when the second valve spool is placed on the second position of the second valve spool. A third shape memory alloy member moves the second valve spool to the second position of the second valve spool while overcoming the upward biasing force of the third unit when the third control current is supplied from the electronic control unit. Besides, a fourth unit moves the second valve spool to the first position of the second valve spool while overcoming the downward biasing force of the third unit when the fourth control current is supplied from the electronic control unit.

When the first and fourth control currents are supplied from the electronic control unit, the first valve spool opens the first inlet and the second valve spool closes the second outlet to press the wheel brake. Meantime, when the second and third control currents are supplied from the electronic control unit, the first valve spool closes the first inlet and the second valve spool opens the second outlet to decrease the wheel brake. On the other hand, if the second and fourth control currents are supplied from the electronic control unit, the first and second valve spools close the first inlet and second outlet to constantly maintain the pressure of the wheel brake.

The anti-lock brake system with the valve utilizing the shape memory alloys according to the present invention is simple in its structure, easy to be manufactured and low in price.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE PREFERRED EMBODIMENTS

The preferred embodiments of the present invention will be described with reference to accompanying drawings, in which the same reference numerals represent the same elements.

Embodiment 1

Figure 2:
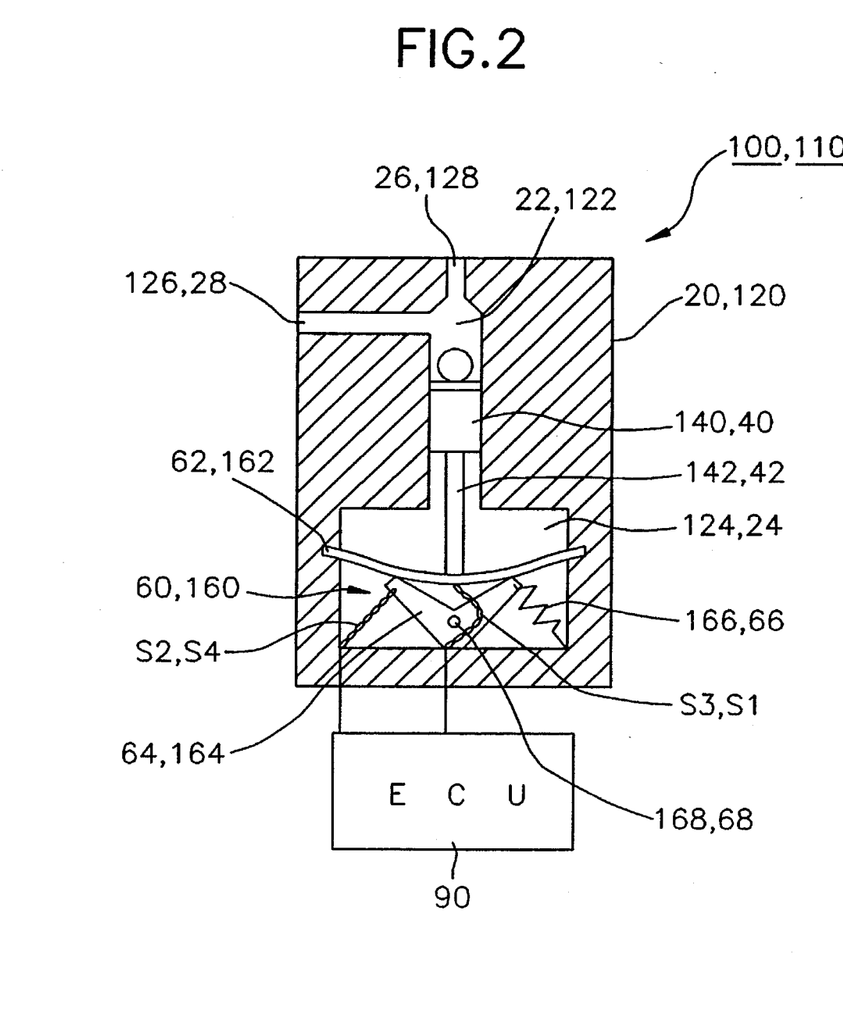
FIG. 2 is a sectional view for showing a valve utilizing shape memory alloys according to one embodiment of the present invention, in which the inlet of the valve is open.
Figure 3:
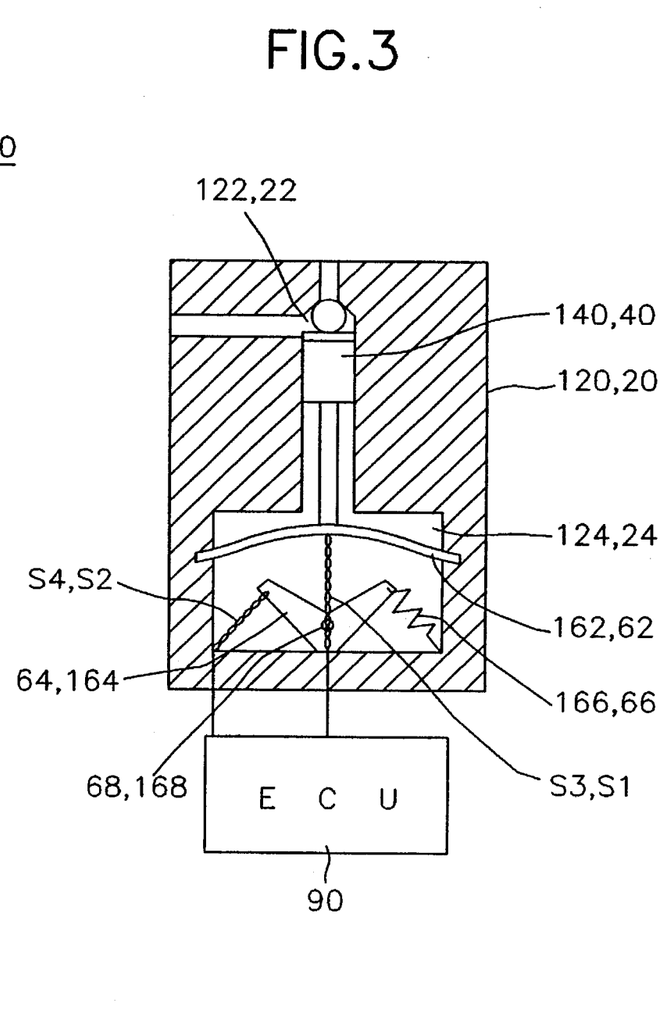
FIG. 3 is a sectional view for showing the state that the inlet of the valve shown in FIG. 2 is closed.

FIGS. 2 and 3 illustrate a valve 100 utilizing shape memory alloys according to a first embodiment of the present invention, in which FIG. 2 shows the open state of valve 100, and FIG. 3 shows the closed state of valve 100.

A bore 22 having an inlet 26 for introducing fluid from a fluid supply source (not shown) and an outlet 28 for discharging the fluid is formed in the upper portion of a housing 20. A compartment 24 is provided to the lower portion of housing 20.

A valve spool 40 is installed to be movable in the up and down direction within bore 22. The upper end of valve spool 40 closes inlet 26 at the raised position, i.e., at a first position as shown in FIG. 3, while inlet 26 is open at the lowered position thereof, i.e., at a second position as shown in FIG. 2. A rod 42 is coupled to the lower end of valve spool 40.

A plate spring 62 for maintaining valve spool 40 on the first position or second position is installed within compartment 24 of housing 20 in the transverse direction. Both ends of plate spring 62 are fixed to the inner sidewall of compartment 24 to be bulgy downward or upward for originating a snap-through buckling in the vertical direction, and rod 42 of valve spool 40 is fixed to the central upper surface of plate spring 62. When plate spring 62 is deformed to be bulgy upward by the snap-through buckling, valve spool 40 is placed on the first position to close inlet 26, and plate spring 62 applies an upward biasing force upon valve spool 40 to permit valve spool 40 to place on the first position. Meantime, when plate spring 62 is deformed to be bulgy downward, valve spool 40 is placed on the second position to open inlet 26, and plate spring 62 applies a downward biasing force upon valve spool 40 to permit valve spool 40 to place on the second position.

A first shape memory alloy member S1 for downward deforming plate spring 62 which is already bulgy upward to move valve spool 40 to the second portion is installed between plate spring 62 and the bottom surface of compartment 24. One end of first shape memory alloy member S1 is fixed to the central bottom surface of plate spring 62, and the other end thereof is fixed to the bottom surface of compartment 24 and then electrically connected to an electronic control unit 90. Once current supplied from electronic control unit 90 flows through first shape memory alloy member S1, heat is generated in first shape memory alloy member S1 to contract first shape memory alloy member S1. At this time, by the contraction of first shape memory alloy member S1, plate spring 62 is deformed to be bulgy downward, valve spool 40 is moved to the second position and inlet 26 maintains the open state.

An arising part 60 is installed between plate spring 62 and the bottom plane of compartment 24. Arising part 60 moves valve spool 40 to the first position of valve spool 40 under the state that plate spring 62 budgies downward i.e., that valve is placed on the second position of valve spool 40. Arising part 60 includes a V-shaped lever 64 for applying a force to deform plate spring 62 to be bulgy upward, a second shape memory alloy member S2 for pivoting lever 64 and a first spring 66 for pivoting back lever 64 pivoted by second shape memory alloy member S2 to the original position thereof.

As illustrated in FIGS. 2 and 3, lever 64 is shaped as an alphabet "V" and installed to the central bottom of compartment 24 to be able to pivot about a first shaft pin 68. Both ends of lever 64 contact the lower surface of plate spring 62 when plate spring 62 becomes bulgy downward, i.e., when valve spool 40 is placed on the second position.

Second shape memory alloy member S2 is installed between one end of lever 64 and the bottom surface of compartment 24. Once the current from electronic control unit 90 flows through second shape memory alloy member S2, second shape memory alloy member S2 is heated and then is contracted by the generated heat. Therefore, plate spring 62 is deformed to be bulgy upward by means of lever 64 which pivots counter-clockwise by the contraction of second shape memory alloy member S2.

First spring 66 is installed between the other end of lever 64 and the bottom surface of compartment 24. Lever 64 pivoted by second shape memory alloy member S2 pivots clockwise by first spring 66 to return to its original position.

The operation of valve 100 utilizing shape memory alloys according to the first embodiment of the present invention will be described below.

As shown in FIG. 3, when valve spool 40 is placed on the first position, i.e., under the state that inlet 26 of valve 100 is closed by valve spool 40, electronic control unit 90 generates a first control current which then flows through first shape memory alloy member S1 to heat first shape memory alloy member S1. By the heating, first shape memory alloy member S1 contracts. Due to this contraction of first shape memory alloy member S1, plate spring 62 is deformed to be bulgy downward. Consequently, as shown in FIG. 2, valve spool 40 is moved to the second position and inlet 26 is open.

At this time, the fluid is introduced to bore 22 via inlet 26 and discharged through outlet 28. Therefore, a pressure of the outlet side of valve 100 is increased (ON).

Thereafter, when valve spool 40 is placed on the second position as shown in FIG. 2, electronic control unit 90 generates a second control current. By the flow of the second control current through second shape memory alloy member S2 of ascending part 60, second shape memory alloy member S2 contracts to allow lever 64 to pivot counter-clockwise. By the pivoting counter-clockwise, lever 64 contacting the bottom surface of plate spring 62 makes plate spring 62 move upward. By this operation, plate spring 62 is again deformed to be bulgy upward. Accordingly, valve spool 40 is again moved to the first position and, as shown in FIG. 3, inlet 26 of valve 100 is closed to block the flow of the fluid (OFF).

Figure 4:
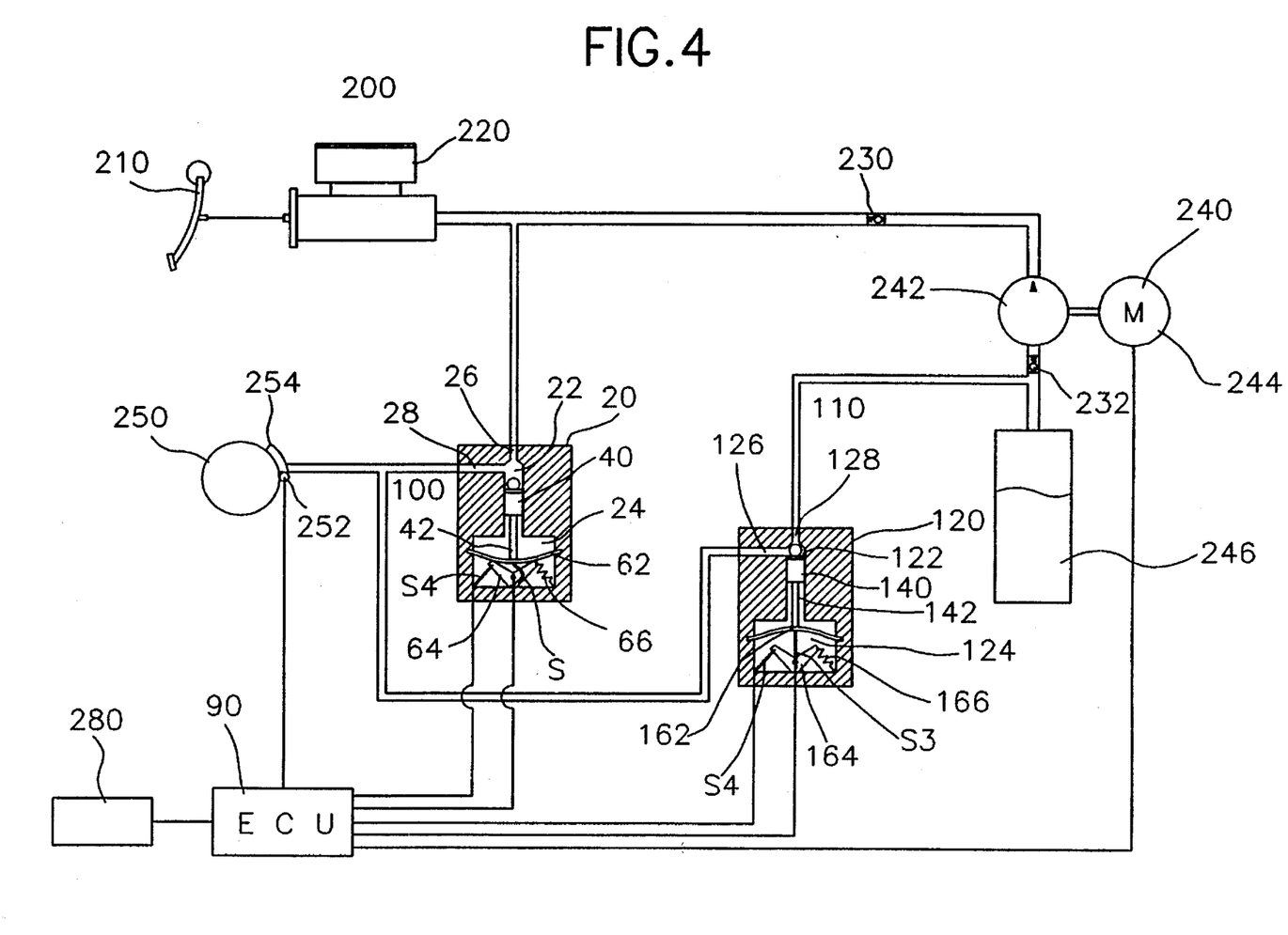
FIG. 4 is a schematic view for showing a construction of an anti-lock brake system employing the valve of FIGS. 2 and 3.

FIG. 4 is a view for showing a construction of an anti-lock brake system 200 which employs first valve 100 and a second valve 110 according to the first embodiment of the present invention. As shown in FIGS. 2 and 3, the structures and operations of first valve 100 and second valve 110 are the same as each other. Here, every element of first valve 100 is affixed with "first" except second shape memory alloy member S2. For example, the housing of first valve 100 is designated as first housing 20. Meanwhile, every element of second valve 110 is designated such that the housing is a second housing 120, compartment is a second compartment 124, bore is a second bore 122, inlet is a second inlet 126, outlet is a second outlet 128, valve spool is a second valve spool 140, rod is a second rod 142, plate spring is a second plate spring 162, lever is a second lever 164, first spring is a second spring 166, a shape memory alloy member fixed to second plate spring 162 is a third shape memory alloy member S3, a shape memory alloy member fixed to lever 164 is a fourth shape memory alloy member S4 and spring for elastically supporting lever 164 is a second spring 166.

In order to incorporate the valves utilizing the shape memory alloys to an anti-lock brake system, overall contraction and relaxation time of the shape memory alloy members should be 100 milliseconds (ms) or below, and preferably with several tens to a hundred of ms. Also, it should apply a tensile force of 5 kgf in maximum. For instance, the shape memory alloys disclosed in the above-mentioned U.S. Pat. No. 5,092,901 may be utilized. To satisfy the property of the shape memory alloy members, i.e., to satisfy 100 ms and 5 Kgf, the shape memory alloy members can be formed by means of an individual or a bundle of shape memory alloy fibers commercially available.

One side of a master cylinder 220 is linked to a brake pedal 210. By a driver's stepping on brake pedal 210, master cylinder 220 provides a hydraulic pressure to a wheel brake 254 attached to a wheel 250 of a vehicle.

A hydraulic regulator 240 has a hydraulic pump 242 for regulating the hydraulic pressure of master cylinder 220 and a hydraulic motor 244 for driving hydraulic pump 242. Hydraulic pump 242 of hydraulic regulator 240 is connected to master cylinder 220 via a first check valve 230. Hydraulic motor 244 regulates the hydraulic pressure to be constant and is automatically stopped when the pressure exceeds a predetermined value.

An accumulator 246 for storing brake oil is connected to hydraulic pump 242 of hydraulic regulator 240 via a second check valve 232.

First and second valves 100 and 110 according to the first embodiment of the present invention are used as an actuator in this preferred embodiment. Especially, first valve 100 is utilized as a pressing valve, and second valve 110 is as an exhausting valve. First inlet 26 of first valve 100 is joined between master cylinder 220 and first check valve 230. First outlet 28 is connected to wheel brake 254. Second inlet 126 of second valve 110 is joined between wheel brake 254 and first outlet 28 of first valve 100. Second outlet 128 is linked between second check valve 232 and accumulator 246.

A wheel-speed sensor 252 is attached to wheel 250 to sense the speed of wheel 250, thereby generating a wheel-speed signal. A vehicle-speed sensor 280 detects the speed of the vehicle to generate a vehicle-speed signal.

Figure 8:
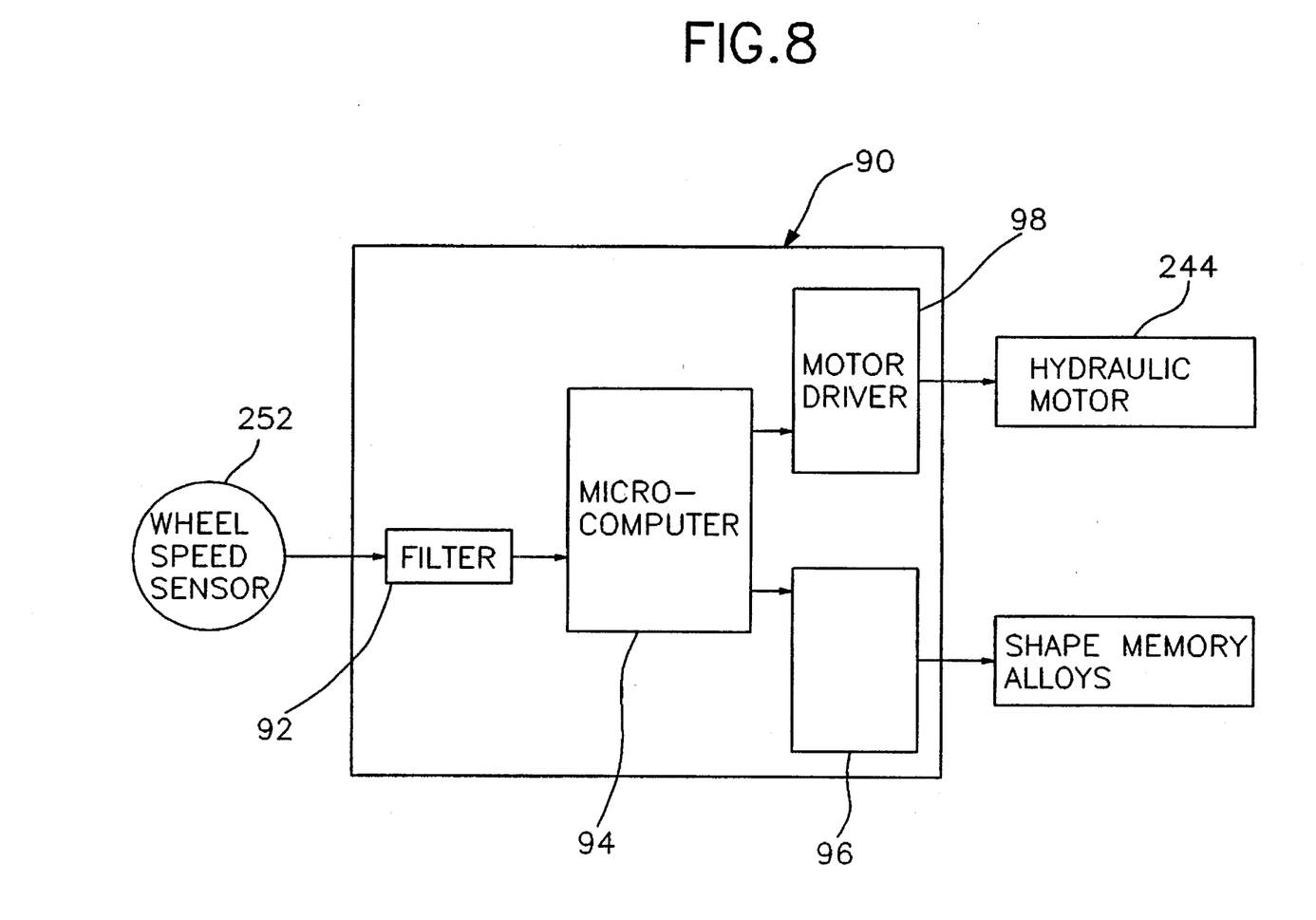
FIG. 8 is a block diagram for showing a construction of the electronic control unit employed to the present invention.

Electronic control unit 90 for controlling first and second valves 100 and 110 and hydraulic regulator 240, as illustrated in FIG. 8, includes a filter 92, a microcomputer 94, a shape memory alloy driver 96 for actuating first and second shape memory alloy members S1 and S2 of first valve 100 and third and fourth shape memory alloy members S3 and S4 of second valve 110, and a motor driver 98 for driving hydraulic motor 244. Electronic control unit 90 is electrically-connected to wheel-speed sensor 252, vehicle-speed sensor 280, first and second valves 100 and 110, and hydraulic motor 244.

Filter 92 receives to filter the wheel-speed signal from wheel-speed sensor 252, and the filtered signal is then transmitted to microcomputer 94.

Microcomputer 94 calculates a difference (%) between the received vehicle-speed signal and wheel-speed signal. When the above-mentioned speed difference is zero, it means the locking state of wheel 250. The locking of wheel 250 adversely affects a braking distance and steering of the vehicle. Thus, it is required to lower the pressure of wheel brake 254 to prevent the locking of wheel 250. In this case, the hydraulic pressure of wheel brake 254 should be reduced down to release the locking of wheel 250. The speed difference being 100 means that wheel brake 254 is not operated. In this case, the hydraulic pressure of wheel brake 254 is necessarily increased to decelerate the speed of wheel 250.

On the other hand, if the speed difference is greater than zero but smaller than 100, the difference means an unlocking state even though wheel brake 254 is being operated. In this case, the speed difference is compared with a predetermined value, preferably 10%. Then, if the speed difference is larger than the predetermined value, wheel brake 254 is pressed to decelerate the speed of wheel 250; whereas, if the speed difference is smaller than the predetermined value, the hydraulic pressure of wheel brake 254 is lowered to accelerate the speed of wheel 250. If the speed difference equals to the predetermined value, the hydraulic pressure of wheel brake 254 is constantly maintained.

When the speed difference is larger than the predetermined value, microcomputer 94 generates a pressing signal for pressing wheel brake 254. The pressing signal generates the first current control signal for controlling intensity of the current supplied to first shape alloy member S1 of first valve 100 and fourth shape memory alloy member S4 of second valve 110, and a first timing signal for controlling time taken for supplying the current to first shape memory alloy member S1 of first valve 100 and fourth shape memory alloy member S4 of second valve 110.

When the speed difference is smaller than the predetermined value, microcomputer 94 generates an exhausting signal for exhausting wheel brake 254. The exhausting signal generates a second current control signal for controlling intensity of the current supplied to second shape memory alloy member S2 of first valve 100 and third shape memory alloy member S3 of second valve 110, and a second timing signal for controlling time taken for supplying the current to second shape memory alloy member S2 of first valve 100 and third shape memory alloy member S3 of second valve 110.

When the speed difference equals to the predetermined value, microcomputer 94 generates a maintaining signal for constantly maintaining the oil pressure of wheel brake 254. The maintaining signal includes a third current control signal for controlling intensity of the current supplied to second shape memory alloy member S2 of first valve 100 and fourth shape memory alloy member S4 of second valve 110, and a third timing signal for controlling time taken for supplying the current to second shape memory alloy member S2 of first valve 100 and fourth shape memory alloy member S4 of second valve 110.

In addition, microcomputer 94 generates an oil-pressure control signal for controlling hydraulic motor 244 which drives hydraulic pump 242. The above-described first, second and third current control signals and first, second and third timing signals are transmitted to shape memory alloy driver 96.

Figure 9:
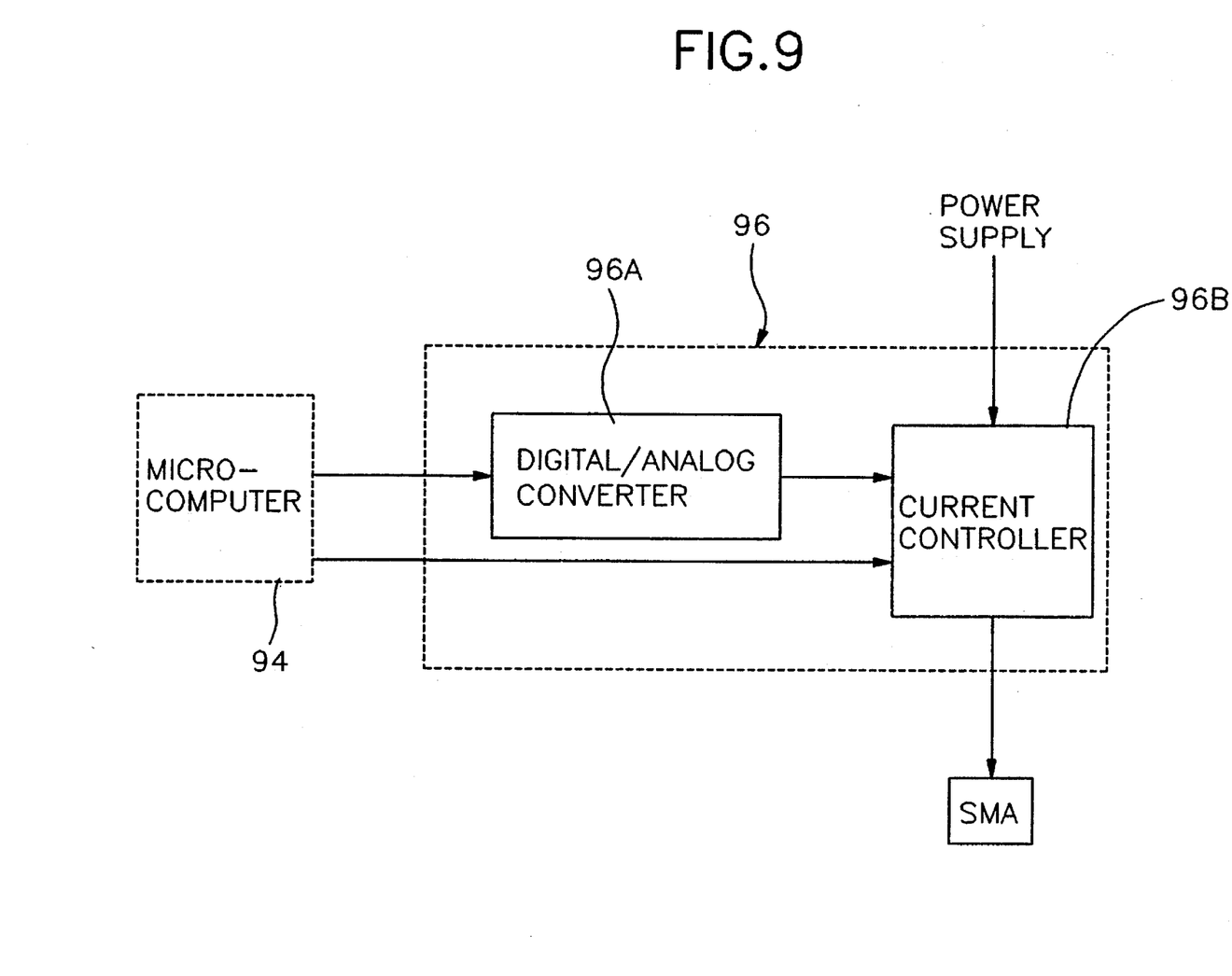
FIG. 9 is a block diagram for showing a construction of the shape memory alloy driver of FIG. 8.

As illustrated in FIG. 9, shape memory alloy driver 96 has a digital/analog converter (hereinafter referred to D/A converter) 96A and a current controller 96B.

D/A converter 96A receives the first, second and third current control signals from microcomputer 94 to convert the received signals to analog signals.

Current controller 96B supplied with power from a power supply apparatus (not shown) receives the foregoing first current control signal and first timing signal to generate a first control current supplied to first shape memory alloy member S1 and a fourth control current supplied to fourth shape memory alloy member S4. Besides, current controller 96B receives the foregoing second current control signal and second timing signal to generate a second control current supplied to second shape memory alloy member S2 and a third control current supplied to third shape memory alloy member S3, and receives the third current control signal and third timing signal to generate the second control current supplied to second shape memory alloy member S2 and fourth control current supplied to fourth shape memory alloy member S4.

Motor driver 98 activates hydraulic motor 244 in accordance with the oil-pressure control signal from microcomputer 94. When the pressure within the anti-lock brake system becomes down to the predetermined pressure or below, hydraulic motor 244 is driven again by motor driver 98.

The operation of the above-stated anti-lock brake system which employs first and second valves 100 and 110 utilizing the shape memory alloys according to the first embodiment of the present invention will be described below.

When a driver suddenly steps on brake pedal 210 to immediately decelerate and/or stop the vehicle, the oil pressure is generated in master cylinder 220. At this time, wheel brake 254 is locked to abruptly decelerate wheel 254, thereby operating anti-lock brake system 200 which then repeats the pressing, exhausting and pressure-maintaining operations irregularly altered in accordance with circumstance.

When the difference between the vehicle speed and wheel speed is larger than the predetermined value, microcomputer 94 of electronic control unit 90 produces the pressing signal for pressing wheel brake 254. The first current control signal and first timing signal are transmitted to current controller 96B by means of the pressing signal. Current controller 96B supplies the first control current to first shape memory alloy member S1 of first valve 100, and the fourth control current to fourth shape memory alloy member S4 of second valve 110 in accordance with the received first current control signal and first timing signal.

Upon the supply of the first control current to first shape memory alloy member S1 of first valve 100, first valve spool 40 is moved to the second position of first valve spool 40 to open first inlet 26. Meanwhile, once the fourth control current is supplied to fourth shape memory alloy member S4 of second valve 110, second valve spool 140 is moved to the first position of second valve spool 140 to close second outlet 128. Consequently, the brake oil flows toward first outlet 28 via first inlet 26 and first bore 22 of first valve 100 to increase the pressure of wheel brake 254 (pressing). Accordingly, wheel brake 254 is operated to decelerate the relative speed of wheel 250 with respect to the vehicle speed.

When the difference between the vehicle speed and wheel speed is smaller than the predetermined value, microcomputer 94 of electronic control unit 90 produces the exhausting signal for exhausting wheel brake 254. The second current control signal and second timing signal are transmitted to current controller 96B by means of the exhausting signal. Current controller 96B supplies the second control current to second shape memory alloy member S2 of first valve 100, and the third control current to third shape memory alloy member S3 of second valve 110 in accordance with the received second current control signal and second timing signal.

Upon the supply of the second control current to second shape memory alloy member S2 of first valve 100, first valve spool 40 is moved to the first position of first valve spool 40 to close first inlet 26. Meanwhile, once the third control current is supplied to third shape memory alloy member S3 of second valve 110, second valve spool 140 is moved to the second position of second valve spool 140 to open second outlet 128. Consequently, the brake oil flows to accumulator 246 through a brake oil passage consisting of second inlet 126, second bore 122 and second outlet 128 of second valve 110 to decrease the pressure of wheel brake 254 (exhausting). Accordingly, the speed of wheel 250 becomes fast relatively to the vehicle speed.

When the difference between the vehicle speed and wheel speed equals to the predetermined valve, microcomputer 94 of electronic control unit 90 generates the maintaining signal for maintaining the hydraulic pressure of wheel brake 254. The third current control signal and third timing signal are transmitted to current controller 96B by means of the maintaining signal. Current controller 96B supplies the second control current to second shape memory alloy member S2 of first valve 100, and the fourth control current to fourth shape memory alloy member S4 of second valve 110 in accordance with the received third current control signal and third timing signal.

Upon the supply of the second control current to second shape memory alloy member S2 of first valve 100, first valve spool 40 moves to the first position of first valve spool 40 so as to close first inlet 26. Meanwhile, once the fourth control current is supplied to fourth shape memory alloy member S4 of second valve 110, second valve spool 140 moves to the first position of second valve spool 140 so as to close second outlet 128. Consequently, the brake oil passage toward accumulator 246 is blocked to constantly maintain the pressure of wheel brake 254.

In the sequence of above-described steps, the pressing, exhausting and pressure maintaining operations of wheel brake 254 are repeated to thus decelerate the speed of the vehicle.

Embodiment 2

Figure 5:
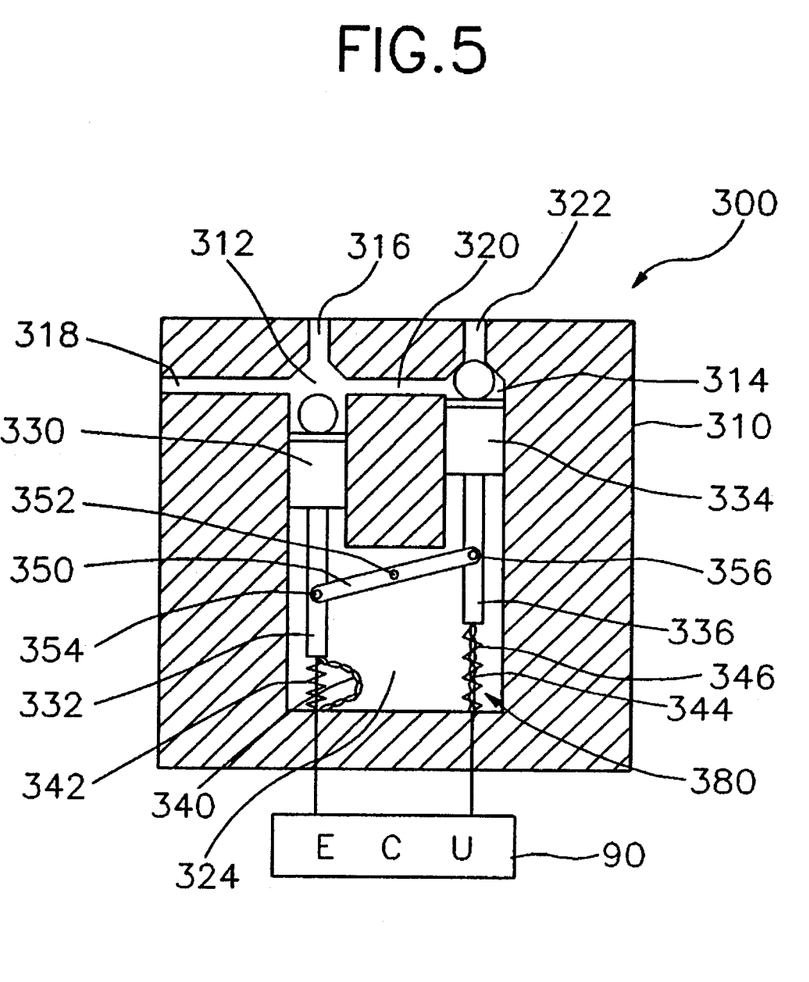
FIG. 5 is a sectional view for showing the valve according to a second embodiment of the present invention.

FIG. 5 illustrates a valve 300 utilizing shape memory alloys according to a second embodiment of the present invention.

In FIG. 5, a pressing bore 312 having a pressing inlet 316 for introducing fluid from a fluid supply source (not shown) and a pressing outlet 318 for discharging the fluid to an operating object (not shown), and an exhaust bore 314 having an exhausting inlet 320 for introducing the fluid from the operating object and an exhausting outlet 322 for discharging the fluid are formed in the upper portion of a housing 310. A compartment 324 is provided to the lower portion of housing 310. Exhausting inlet 320 allows pressing bore 312 to communicate with exhaust bore 314.

A pressing valve spool 330 is mounted within pressing bore 312 to be movable in the up and down direction. The upper end of pressing valve spool 330 closes pressing inlet 316 at the raised position, i.e., at a first position, while pressing inlet 316 is open at the lowered position, i.e., at a second position. A pressing rod 332 is coupled to the lower end of pressing valve spool 312. An exhausting valve spool 334 is mounted within exhaust bore 314 to be movable in the up and down direction. The upper end of exhausting valve spool 334 closes exhausting outlet 322 at the ascending position, i.e., at a first position, while exhausting outlet 322 is open at the lowered position, i.e., at a second position. An exhausting rod 336 is coupled to the lower end of exhausting valve spool 334.

A first actuating part 380 actuated by shape memory alloys which are controlled by pressing current and exhausting current generated from electronic control unit 90 is installed within compartment 324 of housing 310 for alternately operating pressing valve spool 330 and exhausting valve spool 334. First actuating part 380 permits exhausting valve spool 334 to move to the first position of exhausting valve spool 334 when pressing valve spool 330 is placed on the second position of pressing valve spool 30, i.e., when pressing inlet 316 is open; whereas it permits exhausting valve spool 334 to move to the second position of exhausting valve spool 334 when pressing valve spool 330 is placed on the first position thereof, i.e., when pressing inlet 316 is closed.

First actuating part 380 includes a lever 350 having both ends coupled to pressing rod 332 and exhausting rod 336 for alternately moving valve spools 330 and 334 to the corresponding first and second positions. In addition to lever 350, a first bias spring 342 serves for applying an upward biasing force to pressing valve spool 330, and a second bias spring 346 applies the upward biasing force to exhausting valve spool 334. Also, first actuating part 380 has a first pressing shape memory alloy wire 340 for moving pressing valve spool 330 to its second position while overcoming the upward biasing force of first bias spring 342, and a second exhausting shape memory alloy wire 344 for moving exhausting valve spool 334 to its second position while overcoming the upward biasing force of second bias spring 346.

Lever 350 is installed to pivot about a shaft 352 embedded into the inner sidewall of compartment 324, and both ends of lever is joined to pressing rod 324 and exhausting rod 336 by means of pins 354 and 356 to enable valve spools 330 and 334 to be alternately moved up and down direction.

One end of first bias spring 342 is fixed to the end of pressing rod 332, and other end thereof is fixed to the bottom surface of compartment 324 to apply the upward biasing force to pressing rod 332, so that first bias spring 342 maintains pressing valve spool 330 to the first position of pressing valve 330. One end of second bias spring 344 is fixed to the end of exhausting rod 336, and other end thereof is fixed to the bottom surface of compartment 324 to apply the upward biasing force upon exhausting rod 336 so as to maintain exhausting valve spool 334 to the first position of exhausting valve spool 334.

On the other hand, pressing and exhausting shape memory alloy wires 340 and 344 are preferably provided to be linearly shaped. One ends of them are connected to the ends of pressing rod and exhausting rod 332 and 336, and the other ends are fixed to the bottom surface of compartment 324. Pressing shape memory alloy wire 340 is contracted by receiving the pressing current from electronic control unit 90 so that pressing valve spool 330 may move from the first position to the second position thereof. Exhausting shape memory alloy wire 344 is contracted by receiving the exhausting current from electronic control unit 90 so that exhausting valve spool 334 may move from the first position to the second position thereof.

Hereinbelow, the opening/closing operations in valve 300 according to the second embodiment of the present invention constructed as above will be described.

In performing the pressing operation, when the pressing current is supplied from electronic control unit 90 to pressing shape memory alloy wire 340, heat is generated from pressing shape memory alloy wire 340 to be contracted. Since pressing shape memory alloy wire 340 contracts while overcoming the upward biasing force of first bias spring 343, pressing rod 332 joined to one end thereof is lowered. At this time, pressing valve spool 330 is lowered to the second position thereof to open pressing inlet 316. Simultaneously, lever 350 pivots counter-clockwise, and exhausting valve spool 334 moves to the first position thereof by the biasing force of second spring 346 fixed to one end of exhausting rod 336, thereby closing exhausting outlet 322. As the result, the fluid flows through a passage consisting of pressing inlet 316, pressing bore 312 and pressing outlet 318 to increase the pressure of pressing outlet side.

Also, in performing the exhausting operation, the pressing current supplied to pressing shape memory alloy wire 340 is blocked, and the exhausting current is supplied from electronic control unit 90 to exhausting shape memory alloy wire 344. By doing so, exhausting shape memory alloy wire 344 is heated to contract while pressing shape memory alloy wire 340 relaxes. Here, exhausting shape memory alloy wire 344 contracts while overcoming the upward biasing force of second bias spring 346 to lower exhausting valve spool 334 to the second position thereof. At the same time, lever 350 pivots clockwise, pressing valve spool 330 moves to the first position of pressing valve spool 330 by means of first bias spring 342, exhausting outlet 322 is open and exhausting inlet 316 is closed. As a result, the fluid flows through a passage consisting of pressing outlet 318, pressing bore 312, exhausting inlet 320, exhaust bore 314 and exhausting outlet 322, thereby decreasing the pressure of the pressing outlet side.

Embodiment 3

Figure 6:
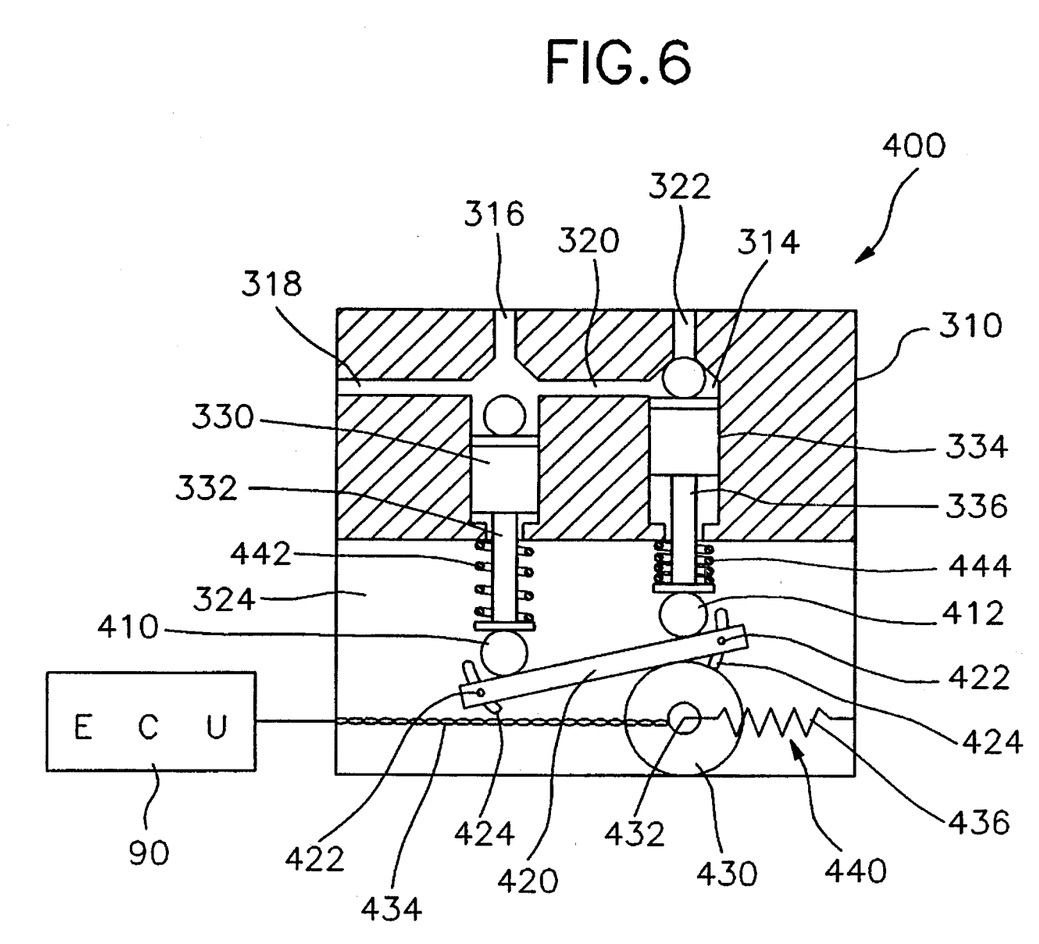
FIG. 6 is a sectional view for showing the valve according to a third embodiment of the present invention.

FIG. 6 illustrates a valve 400 utilizing shape memory alloys according to a third embodiment of the present invention.

In FIG. 6, a housing 310 is the same as that of valve 300 according to the second embodiment of the present invention except for guide grooves 424 formed in the inner sidewall of compartment 324.

Additionally, pressing valve spool 330, pressing rod 332, exhausting valve spool 334 and exhausting rod 336 are the same as pressing valve spool 330, pressing rod 332, exhausting valve spool 334 and exhausting rod 336 of valve 300 according to the second embodiment of the present invention. Balls 410 and 412 performing a sliding movement are fixed to the lower ends of pressing rod 332 linked to pressing valve spool 330 and of exhausting rod 336 linked to exhausting valve spool 334.

A pressing bias spring 442 for applying a downward biasing force to make pressing valve spool 330 place on the second position of pressing valve spool 330 is installed between pressing rod 332 and the ceiling of compartment 324. An exhausting bias spring 444 for exerting the downward biasing force to make exhausting valve spool 334 place on the second position of exhausting valve spool 334 is installed between exhausting rod 336 and the ceiling of compartment 324.

A second actuating part 440 actuated by the shape memory alloys is installed within compartment 324 of housing 310 for alternately moving pressing valve spool 330 and exhausting valve spool 334 to the respective first and second positions.

A plate 420 of second actuating part 440 alternately moves pressing valve spool 330 and exhausting valve spool 334 to respective first positions while the upper surface of plate 420 contacts balls 410 and 412. Four guide pins 422 formed on both sides of plate 420 are inserted into guide grooves 424 in both sides of inner wall of compartment 324 of housing 310, and the lower surface of plate 420 is in contact with a roller 430 to permit the rolling motion. Guide pins 422 are moved along guide grooves 424 by the rolling of roller 430, so that plate 420 executes seesaw motion.

Roller 430 of second actuating part 440 installed below plate 420 cooperates with plate 420 on the first position to move exhausting valve spool 334 to the first position of exhausting valve spool 334 while overcoming the downward biasing force of exhausting bias spring 444, and cooperates with plate 420 on the second position to move pressing valve spool 330 to the first position of pressing valve spool 330 while overcoming the downward biasing force of pressing bias spring 442.

Roller 430 is rotatably mounted about a shaft 432. An actuating shape memory alloy wire 434 which is contracted by the current from electronic control unit 90 and a restoring spring 436 for applying the biasing force upon roller 430 to maintain roller 430 to the first position thereof are linked to shaft 432. One end of actuating shape memory alloy wire 434 is fixed to the inner sidewall of compartment 324, and then electrically connected to electronic control unit 90.

On the other hand, once the current is supplied from electronic control unit 90 to actuating shape memory alloy wire 434, roller 430 rolls to move to the second position of roller 430 while overcoming the biasing force of restoring spring 436 by the contraction of actuating shape memory alloy wire 434. Here, roller 430 cooperates with plate 420 on the second position of roller 430 to move exhausting valve spool 334 to the second position of exhausting valve spool 334, and moves pressing valve spool 330 to the first position of pressing valve spool 330. Thus, exhausting outlet 322 is open and pressing inlet 316 is closed.

However, if the current supply from electronic control unit 90 to actuating shape memory alloy wire 434 is ceased, actuating shape memory alloy wire 434 relaxes and roller 430 rolls to move to the first position of roller 430 by the restoring force of restoring spring 436. At this time, roller 430 cooperates with plate 420 on the first position of roller 430 to move exhausting valve spool 334 to the first position of exhausting valve spool 334, and moves pressing valve spool 330 to the second position of pressing valve spool 330. Thus, exhausting outlet 322 is closed and pressing inlet 316 is open.

The operation of valve 400 utilizing the shape memory alloys according to the third embodiment of the present invention constructed as above will be described below.

FIG. 6 illustrates the pressing state of valve 400 utilizing the shape memory alloys according to the third embodiment of the present invention.

In FIG. 6, valve 400 is under the state that the current is not supplied from electronic control unit 90 to actuating shape memory alloy wire 434, i.e., under the exhausting state.

When the current is supplied to actuating shape memory alloy wire 434 from electronic control unit 90 under the state as shown in FIG. 6, actuating shape memory alloy wire 434 contracts while overcoming the restoring force of restoring spring 436 to roll toward the second position of roller 430. Here, by the seesaw motion of plate 420, pressing valve spool 330 is moved to the first position of pressing valve spool 330 while overcoming the downward biasing force of pressing bias spring 442 of pressing rod 332. Also, exhausting valve spool 334 is moved to the second position of exhausting valve spool 334 by the downward biasing force of exhausting bias spring 444. As a result, pressing inlet 316 is open and exhausting outlet 322 is closed to flow the fluid through a passage consisting of pressing inlet 316, pressing bore 312 and pressing outlet 318, thereby increasing the pressure of the pressing outlet side (pressing).

In order to decrease the pressure of the pressing outlet side, electronic control unit 90 stops the current supply to actuating shape memory alloy wire 434. At this time, actuating shape memory alloy wire 434 relaxes and roller 430 returns to the first position of roller 430 by the restoring force of restoring spring 436. Consequently, as shown in FIG. 6, pressing inlet 316 is closed, and exhausting outlet 322 is open to flow the fluid through a passage consisting of pressing outlet 318, pressing bore 312, exhausting inlet 320 exhaust bore 314 and exhausting outlet 322, thereby decreasing the pressure of the pressing outlet side (exhausting).

Embodiment 4

Figure 7:
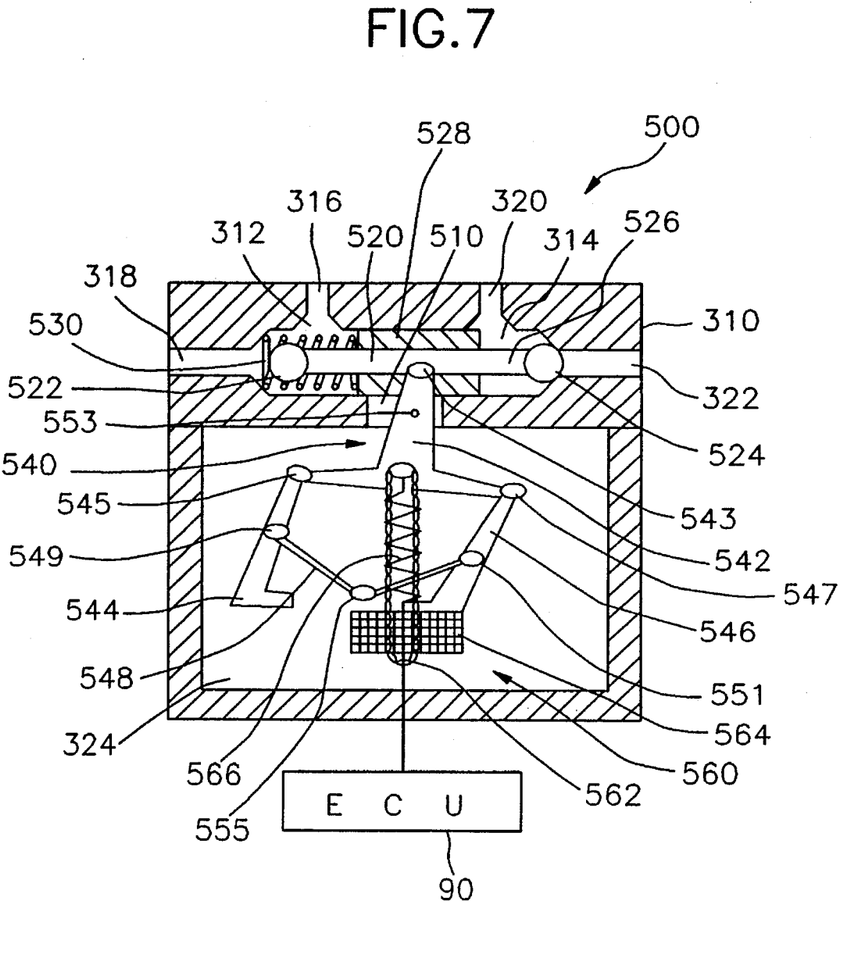
FIG. 7 is a sectional view for showing the valve according to a fourth embodiment of the present invention.

FIG. 7 is a sectional view for showing a valve 500 utilizing shape memory alloys according to a fourth embodiment of the present invention.

As illustrated in FIG. 7, a pressing bore 312 having a pressing inlet 316 for introducing fluid from a fluid supply source (not shown) and pressing outlet 318 for discharging the fluid to an operating object (not shown), and an exhausting bore 314 having an exhausting inlet 320 for introducing the fluid from the operating object and an exhausting outlet 322 for discharging the fluid are formed in the upper portion of a housing 310. A compartment 324 is provided to the lower portion of housing 310. A path 510 connected to compartment 324 is formed between pressing bore 312 and exhausting bore 314.

An integrally-formed valve spool 520 is installed to be movable right to left within pressing bore 312 and exhausting bore 314. Valve spool 520 includes a first spherical part 522 for opening pressing inlet 316 on the first position, a second spherical part 524 for closing exhausting outlet 322 on the first position, a connecting rod 526 for connecting first spherical part 522 to second spherical part 524, and an actuating body 528 for separating pressing bore 312 from exhausting bore 314.

A third bias spring 530 is installed between pressing bore 312 and actuating body 528 for maintaining valve spool 520 on the first position of valve spool 520 by applying the biasing force toward the first position upon valve spool 520.

A linkage part 540 is installed to compartment 324 for moving valve spool 520 from the first position to the second position.

Linkage part 540 includes a first link 542 connected to connecting rod 526 of valve spool 520 to pivot by means of a first connecting pin 543 and pivoting about a first shaft pin 553 which penetrates path 510, a second link 544 connected to one end of first link 542 to pivot by a second connecting pin 545, a third link 546 in opposition to second link 544 connected to the other end of first link 542 to pivot by a third connecting pin 547, and a fourth link 548 of which one end is connected to second link 544 to pivot by a fourth connecting pin 549 and the other end is connected to third link 546 by a fifth connecting pin 551 to pivot about second shaft pin 555. As shown in FIG. 7, second and third links 544 and 546 are shaped as an alphabet "L."

Moreover, an actuating part 560 for actuating linkage part 540 is installed by means of the shape memory alloys for receiving the current supplied from electronic control unit 90. Actuating part 560 includes an actuating block 564 installed at the lower surface of third link 546 of linkage part 540 to apply a force capable of overcoming the biasing force of third bias spring 530 to linkage part 540. Furthermore, an actuating shape memory alloy wire 562 has one end fixed to the center of first link 542 and the other end connected to actuating block 564, and contracts when the current is supplied from electronic control unit 90, and an actuating spring 566 has one end fixed to the center of first link 542 and other end fixed to actuating block 564 for applying the downward biasing force.

Actuating block 564 is suspended to the lower surface of third link 546 of linkage part 540 by means of actuating spring 566 and actuating shape memory alloy wire 562. When the current is supplied from electronic control unit 90 to actuating shape memory alloy wire 562, actuating shape memory alloy wire 562 contracts to elevate actuating block 564 while overcoming the biasing force of actuating spring 566. On the other hand, when the current supply from electron control unit 90 to actuating shape memory alloy wire 562 is ceased, actuating shape memory alloy wire 562 relaxes and actuating block 564 is lowered by actuating spring 566.

The pressing and exhausting operations of valve 500 utilizing the shape memory alloys according to the fourth embodiment of the present invention constructed as above will be described hereinbelow.

FIG. 7 illustrates valve 500 utilizing the shape memory alloys according to the fourth embodiment of the present invention under the pressing state.

As can be noted in FIG. 7, in performing the pressing operation, the current supply to actuating shape memory alloy wire 562 is ceased, and valve spool 520 is placed on the first position of valve spool 520 by the biasing force of third bias spring 530. First spherical part 522 opens pressing inlet 316, and second spherical part 524 closes exhausting outlet 322. As the result, the fluid flows from the fluid supply source through a passage consisting of pressing inlet 316, pressing bore 312 and pressing outlet 318 to increase the pressure of the operating body connected to pressing outlet 318 (pressing).

For exhausting, electronic control unit 90 supplies the current to actuating shape memory alloy wire 562 which, in turn, is contracted by heat. The contraction of actuating shape memory alloy wire 562 elevates actuating block 564 while overcoming the biasing force of actuating spring 566. Third link 546 in contact with actuating block 564 is raised by actuating block 564 which is being elevated.

At this time, the left of fourth link 548 pivots counter-clockwise and the right thereof pivots clockwise about second shaft pin 555 to enlarge an interval between second link 544 and third link 546. By the elevation of actuating block 564, one end of first link 542 connected to third link 546 by means of second connecting pin 547 arises. Once second connecting pin 547 of first link 542 arises, first link 542 pivots counter-clockwise about first shaft pin 553. Consequently, valve spool 520 connected to first link 542 moves to the second position of valve spool 520 while overcoming the biasing force of third bias spring 530. Accordingly, exhausting outlet 322 is open and pressing inlet 316 is closed, so that the fluid flows through a passage consisting of the operating object, exhausting inlet 320, exhausting bore 314 and exhausting outlet 322 to lower the pressure of the operating object (exhausting).

For performing the exhausting operation again, the current supply to actuating shape memory alloy wire 562 is ceased. At this time, actuating shape memory alloy wire 562 relaxes by the weight of actuating block 564 and actuating spring 566, and actuating block 564 is lowered. Also, third bias spring 530 applies the biasing force upon actuating body 528 of valve spool 520 to move valve spool 520 to the first position of valve spool 520. Then, valve 500 is disposed under the state as shown in FIG. 7.

In a valve utilizing shape memory alloys according to the present invention as described above, a Joule's effect by current passing through the shape memory alloys is utilized for controlling the opening/closing of the valve to enable a prompt and accurate control of the opening/closing operation of the valve.

Also, the open state can be continuously maintained by a holding unit without continuously supplying the current to the shape memory alloys, which not only prevents the loss of the shape memory characteristic of shape memory alloys but also economizes the electric power consumption while more accurately carrying out the opening/closing operation of the valve.

In addition to these, the valve utilizing the shape memory alloy wire according to the present invention is simple in its structure to facilitate the design and manufacture thereof, thereby reducing manufacturing cost.

Furthermore, by utilizing the electrically-controlled shape memory alloys, there is provided an anti-lock brake system simple in its structure, easy to be manufactured and low in price. In the anti-lock brake system according to the present invention, the opening/closing operation of the valve can be accurately performed even without continuously supplying the current to the shape memory alloys to slightly consume the electric power and secure reliability during the operation thereof.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A valve comprising:

an electronic control unit for generating a first control current;

a housing having a first bore with a first inlet for introducing fluid from a fluid supply source and a first outlet for discharging the fluid to an operating object in an upper portion thereof, and a compartment in a lower portion thereof;

a first valve spool for closing the first inlet at a first position thereof, opening the first inlet at a second position thereof, and reciprocating between the first position and second position of said first valve spool;

biasing means for applying a biasing force upon said first valve spool; and actuating means utilizing shape memory alloy wires for moving said first valve spool from the first position of said first valve spool to the second position of said first valve spool or from the second position of said first valve spool to the first position of said first valve spool by means of the first control current supplied from said electronic control unit, and opening or closing the first bore, wherein said biasing means is a plate spring installed at an inner sidewall of the compartment for applying an upward biasing force by a snap-through buckling to maintain said first valve spool to the first position of said first valve spool when said valve spool is placed on the first position of said first valve spool, and applying a downward biasing force by the snap-through buckling to maintain said first valve spool to the second position of said first valve spool when said valve spool is placed on the second position of said first valve spool.

2. A valve as claimed in claim 1, wherein said actuating means comprises:

a first shape memory allow wire electronically connected to said electronic control unit, having one end fixed to a lower surface of said plate spring and other end fixed to a bottom surface of the compartment for moving said first valve spool to the second position of said first valve spool while overcoming the upward biasing force of said plate spring when said electronic control unit supplies the first control current thereto;

a lever installed on the bottom surface of the compartment to be capable of pivoting about a shaft, and having an upper portion in contact with said plate spring when said valve spool is placed in the second position of said first valve spool, for applying a force to deform said plate spring to be bulgy upward while pivoting;

a second shape memory alloy wire electrically connected to said electronic control unit, having one end fixed to one end of said lever and the other end fixed to the bottom surface of the compartment for contracting to pivot said lever when a second control current is supplied from said electronic control unit thereto; and a restoring spring installed between said lever and bottom surface of the compartment for applying a restoring force to said lever pivoted by the contraction of said second shape memory alloy wire to return said lever to an original position when the supply of the second control current from said electronic control unit is blocked.

3. An anti-lock brake system comprising:

a master cylinder for generating a hydraulic pressure to a wheel brake attached to a wheel of a vehicle;

a hydraulic regulator having a hydraulic pump for regulating the hydraulic pressure of said master cylinder, and a hydraulic motor for driving said hydraulic pump;

an accumulator linked to said hydraulic pump for storing brake oil;

a wheel-speed sensor attached to said wheel for sensing a wheel speed to generate a wheel-speed signal;

a vehicle speed sensor for sensing a vehicle speed to generate a vehicle-speed signal;

an electronic control unit for receiving the vehicle-speed signal and the wheel-speed signal, and calculating a difference between the vehicle-speed signal and the wheel-speed signal to generate a first control current, a second control current, a third control current, and a fourth control current;

a first valve utilizing a plurality of shape memory alloys for introducing and discharging brake oil to said wheel brake so as to increase pressure of said wheel brake when the first control current is supplied, and for blocking brake oil being supplied to said wheel brake; and a second valve utilizing a plurality shape memory alloys for introducing and discharging brake oil from said wheel brake to said accumulator so as to decrease pressure of said wheel brake when the third control current is supplied, and for blocking brake oil being supplied to said wheel brake, wherein said first valve comprises:

a first housing including a first bore formed in an upper portion thereof with a first inlet being connected between said master cylinder and said hydraulic pump in order to introduce brake oil from said master cylinder, and a first outlet being connected with said wheel brake in order to discharge the brake oil to said wheel brake, and a first compartment in a lower portion thereof;

a first valve spool being movably installed within the first bore and connected with a first rod at lower portion thereof for closing the first inlet at a first position of said first valve spool, for opening the first inlet at a second position for said first valve spool;

a first means for applying an upward biasing force to maintain said first valve spool at the first position of said first valve spool by means of snap-through buckling when said first valve spool is at the first position of said first valve spool, and for applying a downward biasing force to maintain said first valve spool at the second position of said first valve spool by means of snap-through buckling when said valve spool is at the second position of said first valve spool;

a first shape memory alloy member for moving said first valve spool to the second position of said first valve spool while overcoming the upward biasing force of said first means when the first control current is supplied from said electronic control unit; and a second means for moving said first valve spool to the first position of said first valve spool while overcoming the downward biasing force of said first means when the second control current is supplied from said electronic control unit.

4. An anti-lock brake system as claimed in claim 3, wherein said first means includes a first plate spring which has sides being fixed at inner wall of the first compartment, an upper surface being fixed at a lower portion of said first rod.

5. An anti-lock brake system as claimed in claim 4, wherein said second means comprises:

a first lever pivotally installed on bottom surface of the first compartment by means of a first shaft for applying a force to said first plate spring in order to deform said first plate spring to be bulgy upward while overcoming the downward biasing force of said first plate spring when said first valve spool is at the second position of said first valve spool;

a second shape memory alloy member for pivoting said first plate spring when the second control current is supplied; and a first spring being installed between said first lever and the bottom surface of the first compartment for applying a restoring force to said first lever pivoted by the contraction of said second shape memory allow member in order to return said first lever to an original position when the second control current is intercepted from said electronic control unit.

6. An anti-lock brake system as claimed in claim 5, wherein said first shape memory alloy member is a shape memory alloy wire of which one end is fixed on lower surface of said first plate spring, of which the other end is fixed on the bottom surface of the first compartment, which has a total contraction and relaxation time of below 100 milliseconds and generates a maximum tension of 5 Kgf, wherein said second shape memory alloy member is a shape memory alloy wire of which one end is fixed at said first lever, of which the other end is fixed on the bottom surface of the first compartment, which has a total contraction and relaxation time of below 100 milliseconds and generates a maximum tension of 5 Kgf.

7. An anti-lock brake system comprising:

a master cylinder for generating a hydraulic pressure to a wheel brake attached to a wheel of a vehicle;

a hydraulic regulator having a hydraulic pump for regulating the hydraulic pressure of said master cylinder, and a hydraulic motor for driving said hydraulic pump;

an accumulator linked to said hydraulic pump for storing brake oil;

a wheel-speed sensor attached to said wheel for sensing a wheel speed to generate a wheel-speed signal;

a vehicle speed sensor for sensing a vehicle speed to generate a vehicle-speed signal;

an electronic control unit for receiving the vehicle-speed signal and the wheel-speed signal, and calculating a difference between the vehicle-speed signal and the wheel-speed signal to generate a first control current, a second control current, a third control current, and a fourth control current;

a first valve utilizing a plurality of shape memory alloys for introducing and discharging brake oil to said wheel brake so as to increase pressure of said wheel brake when the first control current is supplied, and for blocking brake oil being supplied to said wheel brake; and a second valve utilizing a plurality shape memory alloys for introducing and discharging brake oil from said wheel brake to said accumulator so as to decrease pressure of said wheel brake when the third control current is supplied, and for blocking brake oil being supplied to said wheel brake, wherein said second valve comprises:

a second housing including a second bore formed in an upper portion thereof with a second inlet being connected between said wheel brake and said first valve in order to introduce brake oil from said wheel brake, and a second outlet being connected between said hydraulic pump and said accumulator in order to discharge the brake oil, and a second compartment in a lower portion thereof;

a second valve spool being movably installed within the second bore and connected with a second rod at lower portion thereof for closing the second outlet at a first position of said second valve spool, for opening the second outlet at a second position for said second valve spool;

a third means for applying an upward biasing force to maintain said second valve spool at the first position of said second valve spool by means of snap-through buckling when said second valve spool is at the first position of said second valve spool, and for applying a downward biasing force to maintain said second valve spool at the second position of said second valve spool by means of snap-through buckling when said second valve spool is at the second position of said second valve spool;

a third shape memory alloy member for moving said second valve spool to the second position of said second valve spool while overcoming the upward biasing force of said third means when the third control current is supplied from said electronic control unit; and a fourth means for moving said second valve spool to the first position of aid second valve spool while overcoming the downward biasing force of said third means when the fourth control current is supplied from said electronic control unit.

8. An anti-lock brake system as claimed in claim 7, wherein said third means includes a second plate spring which has sides being fixed at inner wall of the second compartment, and an upper surface being fixed at a lower portion of said second rod.

9. An anti-lock brake system as claimed in claim 8 wherein said fourth means comprises:

a second lever pivotally installed on bottom surface of the second compartment by means of a second shaft for applying a force to said second plate spring in order to deform said second plate spring to be bulgy upward while overcoming the downward biasing force of said second plate spring when said second valve spool is at the second position of said second valve spool;

a fourth shape memory alloy member for pivoting said second plate spring when the fourth control current is supplied; and a second spring being installed between said second lever and the bottom surface of the second compartment for applying a restoring force to said second lever pivoted by the contraction of said fourth shape memory alloy member in order to return said second lever to an original position when the fourth control current is blocked from said electronic control unit.

10. An anti-lock brake system as claimed in claim 9, wherein said third shape memory alloy member is a shape memory alloy wire of which one end is fixed on the lower surface of said second plate spring, of which the other end is fixed on the bottom surface of the second compartment, which has a total contraction and relaxation time of below 100 milliseconds and generates a maximum tension of 5 Kgf, said second shape memory alloy member is a shape memory alloy wire of which one end is fixed at said second lever, of which the other end is fixed on the bottom surface of the second compartment, which has a total contraction and relaxation time of below 100 milliseconds and generates a maximum tension of 5 Kgf.

* * * * *